United States Patent [19]

Gallus

[11] 4,200,153
[45] Apr. 29, 1980

[54] METHOD FOR CEMENTING HIGH TEMPERATURE WELLS

[75] Inventor: Julius P. Gallus, Anaheim, Calif.

[73] Assignee: Union Oil Company of California, Brea, Calif.

[21] Appl. No.: 967,883

[22] Filed: Dec. 8, 1978

Related U.S. Application Data

[63] Continuation-in-part of Ser. No. 844,642, Oct. 25, 1977, Pat. No. 4,144,077, which is a continuation-in-part of Ser. No. 700,387, Jun. 28, 1976, Pat. No. 4,069,870.

[51] Int. Cl.$^2$ .............................................. E21B 33/14
[52] U.S. Cl. ................................... 166/292; 106/97; 106/104
[58] Field of Search ................. 166/293, 292, 294; 106/97, 90, 104

[56] References Cited

U.S. PATENT DOCUMENTS

| Re. 26,597 | 6/1969 | Small et al. ............................ 106/89 |
| 2,198,120 | 4/1940 | Lerch et al. .......................... 166/292 |
| 2,684,913 | 7/1954 | West ........................................ 106/64 |
| 3,117,882 | 1/1964 | Herschler et al. ..................... 106/90 |
| 3,166,518 | 1/1965 | Barnard ............................. 106/97 X |
| 3,376,146 | 4/1968 | Mitchell ................................. 106/97 |
| 3,442,670 | 5/1969 | Parsons ............................. 106/97 X |
| 3,794,504 | 2/1974 | Babcock ............................ 106/97 X |
| 4,006,031 | 2/1977 | Ferch et al. .......................... 106/307 |
| 4,043,828 | 8/1977 | Gaines ................................... 106/97 |
| 4,103,103 | 7/1978 | Hizikata ............................ 106/97 X |

*Primary Examiner*—Stephen J. Novosad
*Attorney, Agent, or Firm*—Dean Sandford; Daniel R. Farrell

[57] ABSTRACT

A cement system including minor amounts of a carbon black cement additive admixed with cement is used to cement high temperature wells.

12 Claims, No Drawings

METHOD FOR CEMENTING HIGH TEMPERATURE WELLS

RELATED APPLICATIONS

This application is a continuation-in-part of copending application Ser. No. 844,642, filed Oct. 25, 1977, now U.S. Pat. No. 4,144,077, which is a continuation-in-part of application Ser. No. 700, 387, filed June 28, 1976, now U.S. Pat. No. 4,069,870.

BACKGROUND OF THE INVENTION

This invention relates to well cementing, and more particularly to the cementing of wells having elevated temperatures.

In the drilling of wells, for example oils wells, wells penetrating sources of geothermal fluids and the like, it is standard practice to utilize a cement to hold the well casing in position and to selectively block or plug portions of the strata through which the well extends so as to prevent the escape of undesirable fluid into the well bore or the loss of drilling muds and the like. When so used, the cement, as an aqueous slurry, is pumped into the annular space between the walls of the bore hole and the casing and permitted to cure so as to form a hardened cement mass which provides the reinforcing and plugging functions.

The cements utilized in drilling operations are formulated so as to be sufficiently slow setting to permit pumping and yet be sufficiently resistant to degradation under the elevated temperature and pressure conditions encountered in the wells. The American Petroleum Institute has promulgated specifications for testing cements to insure that they meet certain minimum requirements with respect to strength, permeability, settling time and the like. These cements are referred to as oil well cements.

To resist the temperatures and pressures normally encountered in wells, the oil well cements have been developed to provide the maximum physical properties under the severe temperature and pressure conditions encountered in relatively deep wells, such as oil wells. These cements are conventionally Portland-type cements to which have been added one or more various additives, such as mica, blast furnace slag, alumina and various special reactive sands, which are designed to improve the mechanical strength and the thermal and chemical resistance of the set and hardened cement. Although satisfactory for conventional well operations, these cements have proven deficient particularly in the case of ultra-deep wells and geothermal wells where temperatures in excess of 400° F. (200° C.) may be encountered. Under such conditions conventional cements quickly increase in porosity and lose compressive strength which may lead to a blowout. Such well blowouts are highly undesirable and can prove to be extremely dangerous, as well as costly to repair.

Accordingly, oil well cements, particularly those used in geothermal wells and in ultra wells, that is wells sunk to depths on the order of 25,000 feet or more, must have the ability to effectively maintain an adequate compressive strength and density and low porosity, even under high temperatures and pressures and in the presence of steam and hot brine. In addition, since the useful life of a typical well is measured in terms of 10 to 30 years, a good oil well cement must operate under the aforementioned severe conditions for a substantial period of time, preferably as long as the life of the well.

However, while recent studies have indicated that oil well cements presently in use have effective lives of on the order of 5 to 10 years when utilized in geothermal wells, it was noted that the strength and permeability of the oil well cement were seriously deteriorated in a period of as short as four years thus raising the possibility of a well blowout and increasing the frequency of replacement and maintenance.

My U.S. Pat. Nos. 4,069,870 and 4,114,692 and my copending application Ser. No. 844,642, now U.S. Pat. No. 4,144,077, disclose a method for cementing high temperature wells using a cement system containing up to 20 weight percent of a low volatile material, carbon-containing cement additive, such as anthracite, uncalcined coke, calcined coke, raw oil shale and burned oil shale. Best results are obtained in the disclosed method when the cement system contains between about 6 and about 15 weight percent of these carbon-containing additives. Although the cement systems and method disclosed therein are superior to conventional cement systems, the cost of the carbon-containing additives required may render these cement systems more expensive than conventional cement systems. A need exists for a relatively inexpensive cement system which is suitable for cementing high temperature wells.

Accordingly a primary object of this invention is to provide a method for cementing high temperature wells using a relatively inexpensive cement system.

Another object of this invention is to provide a method for cementing high temperature wells using relatively small amounts of a cement additive, which amount is effective to impart to the cement mass formed therefrom an improved resistance to degradation of its ultimate compressive strength and permeability under the high temperature and pressure conditions in the well.

Yet another object of this invention is to provide a method for cementing high temperature geothermal wells in which the hardened cement mass formed by the method resists degradation when exposed to hot geothermal fluids.

Further objects, advantages and features of this invention will become apparent to those skilled in the art from the following description and claims.

SUMMARY OF THE INVENTION

Briefly the invention provides a method for cementing a high temperature well in which a hardenable slurry formed from a water-containing liquid vehicle, cement and a minor amount of a carbon black cement additive is introduced through the well into a confined space communicating therewith. The hardenable slurry is allowed to set and harden under the high temperature and pessure conditions in the well to form a hardened cement mass having an improved resistance to degradation of its ultimate compressive strength, density and permeability. Preferably, the carbon black additive is employed in an amount effective to impart to the hardened cement mass an ultimate compressive strength of at least about 1000 p.s.i. and an ultimate permeability less than about 1 millidarcy under the conditions encountered in the well.

The hardenable slurry may be formed by mixing the cement, carbon black additive and water-contained liquid vehicle in any order. Preferably the carbon black additive is dry mixed with the cement prior to bagging and the cement system thus formed can be handled in the usual manner for oil well cements. Conventional additives normally mixed with or used with oil well cements may be incorporated in the cement system. These and other advantages and features of the present invention will become apparent from the following detailed description and as defined by the claims appended thereto.

DESCRIPTION OF THE INVENTION

It has been discovered that the density, compressive strength and permeability of cured cement compositions are less subject to retrogression over a period of time when the cement system, from which the cured cement mass is formed, includes a minor amount of a carbon black cement additive. Of particular interest is the ability of a cement mass formed by the method of this invention to resist degradation of its structural properties when subjected to high temperatures, for example temperatures in excess of about 400° F. (about 200° C.), over an extended period of time. The cement system of the present invention is thus particularly useful as an oil well cement, especially for use in ultradeep wells and geothermal wells where the finished hardened cement mass is to be subjected to substantial pessure, high temperatures and hot fluids, such as steam and hot brine.

As used herein the term "cement system" is used to designate the cement and cement additives in dry form. The term "slurry" is used to denote the cement system when suspended in a liquid vehicle, such as water or a mixture of oil and water. "Cement mass" designates the composition formed upon hydration and curing of the cement system.

The carbon black cement additives suitable for use in the method of this invention include all the known forms of carbon black including lampblacks, channel blacks, furnace blacks, thermal blacks and acetylene blacks. Carbon black is a particulate carbon which typically comprises from about 84 to about 99.5 weight percent fixed carbon and which is produced either by partial combustion or by thermal decomposition of a liquid or gaseous hydrocarbon. The carbon content, particle size distribution, surface area and volatile material contents vary widely among the various types and grades of carbon black. The carbon blacks preferred for use in the method of this invention are those carbon blacks having relatively high carbon contents, such as from about 95 to about 99.5 weight percent carbon, and a correspondingly low volatile material content, such as from about 5 to about 0.5 weight percent. The particle size distribution and surface area of the carbon black employed is not believed critical, and carbon blacks having a mean particle size between about 15 and about 250 millimicrons and surface areas between about 5 and about 350 square meters per gram are believed suitable. Furnace blacks and thermal blacks having the aforementioned properties are particularly preferred.

The amount of carbon black cement additive used in the cement system of this invention will vary within limits depending, inter alia, on the type and grade of the carbon black. The amount of carbon black in the system must be an amount effective to impart to the hardened cement mass formed therefrom a resistance to degradation of its ultimate permeability and compressive strength due to exposure to high temperature, pressure and hot fluids, but the amount included in the cement system should not interfere with the curing of the cement system. Preferably the cement additive comprises between about 0.01 and about 1 weight percent of the cement system, i.e., of the total dry solids, and good results are obtained when the carbon black cement additive comprises between about 0.1 and about 0.5 weight percent of the cement system.

The choice of cement used in the cement system is dependent upon the desired ultimate physical properties of the set, hardened cement and the environment in which the cement is to be utilized. Normally, however, the cement will be a Portland-type oil well cement of one of the classes and types specified by The American Petroleum Institute (API) specification 10A. Depending on the well depth and environment in which the cement is to be used, it will be selected from one of the API classes A through J and will be formulated as an ordinary, moderate sulfate resistant, or high sulfate resistant type cement. The basis for selection of a particular class and type of cement for use in the cement system is well understood by those skilled in the art and is dependent, among other things, upon the depth at which the cement is intended to be used, the desired physical requirements and the chemical environment to which the cement mass is to be subjected. In addition, curing time is an important factor in selecting a particucular class and type of cement. API Class G cement and API Class J cements are preferred for use in the method of this invention. Typically, the cement utilized in the present invention will be class J which is formulated for oil well use at depths of from about 12,000 to 16,000 feet under conditions of high temperature and pressure.

Besides the oil well cements discussed above, other types of cements, including conventional Portland construction cement, can also be utilized in the cement system of the present invention. For example, high alumina and pozzolan type cements, which are also noted for high temperature resistance and high durability under severe environments, for example contact by sea water, are useful. In addition, cements comprising mixtures of Portland cement and possolans or fly ash are also excellent cements for use in geothermal wells and the like. For the purposes of the method of this invention, the cement should constitute a major portion, such as at least about 75 weight percent, of the dry cement system. Good results are obtained wherein the cement constitutes at least about 95 weight of the cement system.

The cement system of the present invention may also include any of the conventional additives utilized to alter the setting, curing or physical properties of the cement. These additives are used in the proportions ordinarily specified for conventional cement systems. For example, various retarders may be added to the cement composition to retard the setting of the cement thereby to render the cement slurry pumpable for a longer period of time than would be the case if no additives were used. Retarders are well-known in the art and do not per se form a part of the present invention, although for example, typical retarders include free lime, calcium sulfate (as gypsum or plaster of Paris), starches, cellulose products, sugars and the like.

Other additives include the so-called dispersing agents which aid in the workability of the cement slurry. Among such additives are surface active materials such as alkali salts of sulfonated fatty alcohols, salts of sulfonated hydrocarbons and fatty acids, carbohydrate salts and non-ionic surfactants such as the condensates of ethylene oxide with substituted phenols. These additives aid workability by permitting a reduction in the watercement ratio, effect greater dispersion of the cement or effect air entrainment, all of which aid in the workability of the cement slurry.

Other additives include the water loss preventatives such as for example methyl hydroxy cellulose and ethyl hydroxy cellulose, which serve to prevent separation of the slurry water during pumping and setting of the cement.

In the utilization of the cement system of the present invention, the cement system, including cement and carbon black cement additive, is preferably admixed with a suitable liquid vehicle to form a pumpable slurry. Water is required to hydrate the cement and therefore a water-containing liquid is required. In the following examples the slurry is a water slurry. As mentioned, however, oil/water mixtures can also be used.

In preparing cement slurried utilizing the cement system of the present invention the percent of water by weight of cement will typically range from about 36 to about 46 percent to form a slurry of pumpable consistency. The slurry thus formed is pumped in conventional fashion into the portion of the well to be cemented. It should be clear, however, that greater or lesser amounts of liquid may be used depending upon the desired consistency and density of the slurry as determined by the method of transporting and placing the slurry in position.

The cement system of the invention is useful in all cementing operations in a well wherein low permeability and high compressive strength of the hardened cement mass are required. In general, the cement slurry is pumped through the well into an enclosed or confined space communicating with the well and therein allowed to cure into a hardened mass. Specifically, the cement system of the present invention will find utility in the well cementing operations as follows:

"Primary Cementing" is the method by which a well casing or liner is cemented in position in a well. The casing is positioned in the well to define a confined annular space between the casing and the walls of the bore hole. A cement slurry is then introduced into this confined space either at the top of the well or, more conventionally, by displacement from the bottom of the well. The slurry is allowed to cure into a solid mass which supports and reinforces the casing and prevents fluid communication between fluid-bearing zones;

"Squeeze cementing" is a method by which a defect in the primary cement job or some other localized problem in the well is remedied. Squeeze cementing is often used to seal off a water producing zone from an oil well. The portion of the well bore containing the defect is isolated, such as with a pair of inflatable packers, and the cement slurry is "squeezed" through a perforation or other hole in the well lining into the confined space to be plugged. The slurry is allowed to cure into a solid mass which seals the defect; and "Plugging back" is a method by which the lowest section of the well is permanently sealed. A well might be plugged back before abandonment, to seal off a water-bearing formation underlying a hydrocarbon-bearing zone, or to allow a directional well to be drilled from a window cut in an intermediate portion of the original well. A cement slurry is introduced into the bottom of the well up to the desired depth and allowed to cure into a solid mass which seals off that portion of the well.

In any case, the cement slurry is formed by admixing the oil well cement, the carbon black additive and the liquid vehicle in any order. The slurry thus formed is introduced into a confined or restricted space wherein it is allowed to set and harden. The cement system of the present invention is especially suitable for applications in which the cement slurry is allowed to cure under the high temperature and pressure conditions encountered in geothermal wells.

The following examples illustrate some preferred cement systems utilizing a carbon black cement additive in accordance with the present invention. The resistance to thermal degradation achieved using the carbon-containing additive is also demonstrated. The examples, however, are not intended as limiting the scope of the invention as defined by the appended claims.

EXAMPLES 1-4

Four cement systems are prepared by admixing API Class G cement with various amounts of a furnace black manufactured and distributed by the Cabot Corporation under the trademark Sterling R. Typical properties of this furnace black include a fixed carbon content of about 99 weight percent, a volatile material content of about 1 weight percent, a surface area of about 25 square meters per gram and a mean particle size of about 75 millimicrons.

A hardenable slurry is formed with each of the cement systems by admixing it with water in an amount equal to about 37 weight percent of the API Class G cement. The slurries are poured into separate molds, the cavities of which define 2-inch cubes. The molds are filled to overflowing; the excess slurry is leveled off with a straight edge; and the openings of the molds are sealed with metal plates. The molds are then placed in an autoclave and are therein maintained at a temperature between about 200° F. and 300° F. and a pressure of about 3,000 p.s.i.g. for about 24 hours in order to partially cure the slurries into hardened cubes.

The hardened cubes are removed from the molds and are then exposed to flowing geothermal steam having a temperature of about 464° F. for a period of three months. Thereafter the cubes are cooled to room temperature. The cubes of Examples 2, 3 and 4 are recovered intact, however the cube prepared in Example 1 using neat API Class G cement is severely cracked indicating a substantial increase in permeability and a substantial reduction in compressive strength. Thus, Example 1 demonstrates that neat API Glass G cement is unsuitable under the conditions of this test.

A 1-inch diameter by 1-inch long core is cut from each of the cubes of Examples 2 through 4 and is used to measure the permeability and compressive strengths of the cement masses. The compressive strength tests are conducted in accordance with API Specification RP 10B, section 6. The permeability tests are conducted utilizing a gas permeameter which consists of a pressure plate and o-ring which are sealed against a face of the core and which is connected to a source of gas under pressure. The gas is introduced into the pressure chamber formed between the pressure plate and the face of the core and the rate of pressure drop is measured. The pressure drop rate is then converted to permeability in millidarcies. The results of these tests are summarized in Table A below.

TABLE A

| Ex. No. | Cement System, weight percent | | Compressive Strength p.s.i. | Permeability millidarcies |
|---|---|---|---|---|
| | API Class G cement | Sterling R furnace black | | |
| 1 | 100.0 | 0.0 | - not determined - | |
| 2 | 99.9 | 0.1 | 4000 | <1 |
| 3 | 99.5 | 0.5 | 3500 | <1 |
| 4 | 95.2 | 4.8 | 1113 | 15.8 |

TABLE B

| Example No. | Well No. | Downhole Temp. °F. | Exposure, Months | Compressive strength P.S.I. | Permeability, millidarcies | |
|---|---|---|---|---|---|---|
| | | | | | To Gas | To water |
| 5 | 1 | 560° | 2 | 1520 | <1 | <1 |
| 6 | 1 | 560° | 3 | 3870 | N.D.[1] | <1 |
| 7 | 2 | 530° | 2 | 2700 | <1 | <1 |
| 8 | 2 | 530° | 3 | 2700 | <1 | <1 |

[1] N.D. means not determined.

It is generally recognized throughout the field of cementing wells that the maximum acceptable permeability of an oil well system is about 1 millidarcy and the minimum acceptable compressive strength is about 1000 to 2000 p.s.i. All of the cubes, regardless of the cement system from which they are formed, have a permeability of less than about 1.0 millidarcies prior to the initiation of the steam tests. From the results summarized above it can be seen that the cement systems of Examples 2 and 3 form cement masses which exhibit substantially no measurable permeability. The cement system of Example 4 shows a substantial increase in permeability. With the higher permeability there is a substantially greater chance that a cement mass formed from the cement system of Example 4 will fail before the cement masses of Examples 2 and 3. Likewise, while the compressive strengths of the cement masses of Examples 2 through 4 exceed 1000 p.s.i., the cement masses of Examples 2 and 3 have compressive strengths over three times the compressive strength of the cement mass of Example 4.

EXAMPLES 5-8

A series of tests are performed to determine the suitability of a cement system of this invention for use in two wells through which different geothermal brines will be flowed.

A hardenable slurry is formed by mixing about 100 parts of API Class J cement, about 0.1 parts of Sterling R furnace black, and about 0.5 parts of a carboxy methyl cellulose water loss inhibitor with about 37 parts of water. Portions of the hardenable slurry are poured into each of four Berea sandstone forms. The forms comprise a 0.25 inch diameter tubing of J-55 casing steel disposed in a 2-inch diameter borehole cut into a 6-inch Berea sandstone cube. The slurry is poured into the annular space between the tubing and the sandstone. Each form is then placed in a separate carrier pipe and two carrier pipes are lowered down each of the two wells in a controlled manner to allow for the gradual heating of the hardenable slurries from ambient temperature to the downhole temperatures of the wells, about 560° F. and about 530° F., respectively. The forms are exposed to hot geothermal brines, high temperatures and high pressures in the two wells.

One form is recovered from each well at the end of two months exposure and the other two forms are recovered at the end of three months exposure. After slowly cooling the forms to room temperature, permeability and compressive strength tests were conducted on cores cut from the cement masses, as described above with respect to Examples 1 through 4 except that the permeability of each core to water was also determined. The results of these tests are summarized in Table B below.

From the foregoing it has been shown that cement systems including a carbon black cement additive in accordance with the present invention demonstrate a resistance to degradation of permeability and a relatively greater compressive strength after exposure to high temperatures and steam as compared to a neat cement system (Example 1) and a cement system with the carbon black cement additive in a concentration which is outside the scope of this invention (Example 4). Also, the cement systems of this invention resist degradation when exposed to hot geothermal brines. Consequently the cement systems of the invention are particularly well suited for use in deep wells and geothermal wells where high temperatures are to be encountered. While the foregoing examples have demonstrated cement compositions using API class J cement and API class G cements, it should be clear that other types and classes of cement may be used in the cement systems of the invention. Also, while the cement system has been described herein in connection with use as an oil well cement, the cement system of this invention may find use in other high temperature environments where resistance to degradation of strength and permeability are important, such as in furnaces, reactors and the like.

The cement systems of the present invention are preferably premixed at the point of manufacture so that the necessity of handling separate additives and the attendant increase in labor costs and the like is avoided.

While particular embodiments of the invention have been described, it will be understood, of course, that the invention is not limited thereto since many obvious modifications can be made, and it is intended to include within this invention any such modification as will fall within the scope of the appended claims.

Having now described the invention, I claim:

1. A method for placing a hardened cement mass having improved resistance to degradation of its ultimate permeability and compressive strength when exposed to high temperatures in a confined space in fluid communication with a well, comprising:

forming a hardenable slurry comprised of a cement system and a water-containing liquid vehicle, said cement system comprising (1) a cement selected from the group consisting of Portland cement, pozzolan cement, high alumina cement and mixtures thereof, and (2) a carbon black cement additive which is present in an amount, between about 0.01 and about 1 weight percent of said cement system, effective to improve the resistance to degradation of the ultimate permeability and compressive strength of said cement mass;

introducing said hardenable slurry through said well and into said confined space; and allowing said hardenable slurry to set and harden under the high temperature and pressure conditions in said well to thereby form said cement mass.

2. The method defined in claim 1 wherein said cement is an oil well cement.

3. The method defined in claim 1 wherein said cement is selected from the group consisting of API class G cement and API class J cement.

4. The method defined in claim 1 wherein said cement system consists essentially of said cement and cement additive.

5. The method defined in claim 1 wherein said water-contained liquid vehicle is water and comprises between about 36 and about 46 weight percent of said hardenable slurry.

6. The method defined in claim 1 wherein said cement additive is selected from the group consisting of furnace blacks, thermal blacks and mixtures thereof.

7. The method defined in claim 1 wherein said cement additive has a fixed carbon content between about 95 and about 99.5 weight percent.

8. The method defined in claim 1 wherein said cement additive comprises between about 0.1 and about 0.5 weight percent of said cement system.

9. The method defined in claim 1 wherein said confined spaced is an annular space between the walls of said well and a casing or liner disposed in said well.

10. A method for placing a hardened cement mass having improved resistance to degradation of its ultimate permeability and compressive strength when exposed to high temperatures in a confined space in fluid communication with a well, comprising:
   forming a hardenable slurry comprised of a cement system and a water-containing liquid vehicle, said cement system comprising
   (1) an oil well cement selected from the group consisting of API Class G cement and API Class J cement, and
   (2) a carbon black cement additive having a fixed carbon content between about 95 and about 99.5 weight percent, said cement additive being present in an amount, between about 0.1 and about 0.5 weight percent of said cement system, effective to impart to said cement mass an ultimate compressive strength of at least about 1,000 p.s.i. and an ultimate permeability less than about one millidarcy; and
   introducing said hardenable slurry through said well and into said confined space; and
   allowing said hardenable slurry to set and harden under the high temperature and pressure conditions in said well to thereby form said cement mass.

11. The method defined in claim 10 wherein said confined space is an annular space between the walls of said well and a casing or liner disposed in said well.

12. The method defined in claim 10 wherein said cement system consists essentially of said oil well cement and said cement additive.

* * * * *